US006434480B1

(12) United States Patent
Kubota et al.

(10) Patent No.: US 6,434,480 B1
(45) Date of Patent: Aug. 13, 2002

(54) INFORMATION COMMUNICATIONS APPARATUS FOR VEHICLE

(75) Inventors: Tomoki Kubota; Hideaki Morita, both of Tokyo-to; Hidefumi Okabe, Chiba-ken, all of (JP)

(73) Assignee: Kabushikikaisha Equos Research (JP)

(*) Notice: Subject to any disclaimer, the term of this patent is extended or adjusted under 35 U.S.C. 154(b) by 0 days.

(21) Appl. No.: 09/484,433

(22) Filed: Jan. 18, 2000

(30) Foreign Application Priority Data

Jan. 19, 1999 (JP) .......................................... 11-011003

(51) Int. Cl.[7] .................................................. G06F 7/00
(52) U.S. Cl. ........................ 701/207; 455/455; 701/300
(58) Field of Search ................................ 701/200, 207, 701/208, 300; 340/988, 933–935, 937; 455/455, 456

(56) References Cited

U.S. PATENT DOCUMENTS 5,369,591 A * 11/1994 Broxmeyer ................. 701/301
5,506,587 A * 4/1996 Lans ..................... 342/357.09
5,751,245 A * 5/1998 Janky et al. ........... 342/357.02

FOREIGN PATENT DOCUMENTS

JP 9-259387 10/1997

* cited by examiner

*Primary Examiner*—William A. Cuchlinski, Jr.
*Assistant Examiner*—Edward Pipala
(74) *Attorney, Agent, or Firm*—Lorusso & Loud

(57) ABSTRACT

Information communications apparatuses used in an information communications system between at least two vehicles. Each of the information communication apparatuses comprises position measuring means; transmission channel setting means for setting an information transmission channel by utilizing the positional information of the vehicle; information transmission means for transmitting information; reception channel setting means for setting a reception channel for receiving information; and information reception means for receiving information transmitted from other vehicle or an information center using the established reception channel. According to the apparatus having structure described above, the transmission vehicle transmits the information by means of the established transmission channel set by the transmission setting means and the reception vehicle receives the transmitted information by means of the reception channel established by the reception channel setting means.

22 Claims, 17 Drawing Sheets

FIG.4

| GRID | POINT COORDINATES | TRANSMISSION RECEPTION FREQUENCY |
|---|---|---|
| G1 | X1,Y1 | f1 |
| G2 | X2,Y2 | f2 |
| G3 | X3,Y3 | f3 |
| : | : | : |
| G4 | Yn,Yn | fn |

FIG. 12

| ROAD (ENTERING to INTERSECTION) | THE NUMBER OF LANES | LANE | TRANSMISSION RECEPTION FREQUENCY |
|---|---|---|---|
| Ra | 1 | 1 | f1 |
| Rb | 2 | 1 | f2 |
| | | 2 | f3 |
| Rc | 1 | 1 | f4 |
| Rd | 2 | 1 | f5 |
| | | 2 | f6 |

INFORMATION COMMUNICATIONS APPARATUS FOR VEHICLE

BACKGROUND OF THE INVENTION

1. Field of the Invention

The present invention relates to an information communications apparatus for a vehicle which is used for communicating a wide variety of information (e.g., information on traffic and weather conditions) in various situations such as vehicle to vehicle, electronic beacon to vehicle, and information center to vehicle.

2. Description of the Prior Art

As an example of an information communications apparatus for a vehicle, Japanese Laid-Open Patent Publication No. HEI 9-259387 discloses a traffic congestion information detector, a traffic congestion information system and a traffic congestion information receiving/displaying apparatus.

The purpose of the arrangement disclosed in this publication is to make it possible to detect traffic congestion information without having to provide any facilities on the road. In this connection, FIG. 15 shows the outline of such arrangement, in which a vehicle 1 is provided with a traffic congestion information detector 2 and a traffic congestion information receiving/displaying device 3.

The traffic congestion information detector 2 uses GPS navigation or the like to continuously detect the current position of the vehicle. Further, every time the vehicle moves through a predetermined traveling interval the traffic congestion information detector 2 automatically calculates the time required to pass through such traveling interval. The information of the required time is transmitted to a traffic information center 4 via radio communication together with the information of the identification number of such traveling interval.

At the traffic information center 4, the traveling interval identification number and the required time thereof transmitted via radio from each vehicle 1 are received and stored. Then, the traffic center 4 transmits the newest required time for each traveling interval by radio to the surrounding vehicles 1. This information transmitted by the traffic information center 4 is received from the traffic congestion information receiving/displaying device 3 mounted in each vehicle 1. Then, the driver or someone else in the vehicle 1 can selectively display the required time for an traveling interval.

However, in such prior art technology described above when many vehicles transmit information from points close to each other using the same transmission frequency, simultaneous transmission by the vehicles can cause radio interference, whereby it becomes impossible for the traffic information center to properly receive the transmitted information.

Further, if different communications channels (communications line) are assigned (allotted) to respective vehicles in an attempt to overcome such problem, a considerable burden will be placed on the communication equipment of the traffic information center 4.

Furthermore, in the prior art technology described above, communication is carried out between vehicles and a traffic information center, but depending on a content of the information to be transmitted, there are cases where it is more convenient to carry out direct vehicle-to-vehicle communication. However, in such a case, a communications apparatus to be mounted in a vehicle must have a function that enables to communicate with each of many communications apparatuses mounted in vehicles, but this results in increased cost due to such function.

SUMMARY OF THE INVENTION

In view of the above-mentioned problem, a main object of the present invention is to provide an information communications apparatus for a vehicle which is capable of transmitting and receiving information without interference even when there are a plurality of vehicles which transmit information from points close to each other.

Another object of the present invention is to provide an information communications apparatus for a vehicle which is capable of transmitting and receiving information without increasing the burden in communications equipment.

In order to achieve these objects, the present invention is directed to an information communications apparatus for a vehicle, which comprises:

position measuring means for measuring position of the vehicle;

transmission channel setting means for setting an information transmission channel by utilizing the positional information of the vehicle which is measured by the position measuring means; and information transmission means for transmitting information externally by means of the transmission channel set by the transmission channel setting means.

In this invention, it is preferred that when the vehicle reaches at a set specified point or area or at a point which is far from the specified position or area by a predetermined distance, the transmission channel setting means sets a channel to a transmission channel which is previously assigned to the specified point or area, and then the information transmission means transmits the information by means of the established transmission channel.

As described above, in the present invention individual transmission channels are previously assigned to the respective specified points or areas, and the transmission is carried out using the assigned transmission channel. This makes it possible to receive information without interference as long as transmission channels are different to each other, even in the case where a plurality of vehicles transmit information from points close to each other.

Further, it is also preferred that the communications apparatus further comprises memory means which stores a table having a collection of data of each specified point with respect to its assigned transmission channel or having a collection of data of each specified area with respect to its assigned transmission channel, wherein the transmission channel setting means establishes the transmission channel assigned to the specified point or area corresponding to the vehicle position which is measured by the position measuring means by referring to the table In the memory means.

Preferably, in the present invention, different transmission channels are assigned to the adjacent specified points or areas.

Alternatively, it is also preferred that different transmission channels are assigned to each of roads or each of traffic lanes, wherein the channel setting means establishes the transmission channel which is previously assigned to a road or lane along which the vehicle is travelling when the vehicle reaches at the intersection or at a position which is far from the intersection by a predetermined distance, and then the information transmission means transmits the information by means of the established transmission channel.

In this case, it is preferred that the information communications apparatus further comprises memory means which stores a table having a collection of data of each road or lane with respect to its assigned transmission channel, wherein the transmission channel setting means establishes the transmission channel assigned to the road or lane in association with the vehicle position measured by the position measuring means by referring to the table stored in the memory.

Preferably, in the present invention, different transmission channels are assigned to the adjacent specified points or areas.

The information communications apparatus further comprises reception channel setting means for setting a reception channel for receiving information; and information reception means for receiving Information transmitted from other vehicle or an information center using the established reception channel set by the reception channel setting means.

In this case, it is preferred that the reception channel setting means is constructed such that an operator in the vehicle can select a desired reception channel.

In a preferred form, when the vehicle reaches at the specified intersection or at a position far away from the intersection by a predetermined distance, the reception channel setting means switches the reception channel in a sequential manner to each of the transmission channels assigned to each of the roads or lanes connected to the intersection by referring to the table stored in the memory means The present invention is also directed to an information communications system between at least two vehicles, in which each of the vehicles comprises:

position measuring means for measuring position of the vehicle;

transmission channel setting means for setting an information transmission channel by utilizing the positional information of the vehicle which is measured by the position measuring means;

information transmission means for transmitting information externally by means of the transmission channel set by the transmission channel setting means:

reception channel setting means for setting a reception channel for receiving information; and information reception means for receiving information transmitted from other vehicle or an information center using the established reception channel set by the reception channel setting means, wherein the transmission vehicle transmits the information by means of the established transmission channel set by the transmission setting means and the reception vehicle receives the transmitted information by means of the reception channel established by the reception channel setting means.

In this case, it is preferred that when the vehicle reaches at a previously set specified point or area or at a point which is far from the specified point or area by a predetermined distance, the transmission channel setting means sets a channel to a transmission channel which is assigned to the specified point or area, and then the information transmission means transmits the information by means of the established transmission channel.

Further, it is also preferred that each vehicle further comprises memory means which stores a table having a collection of data of each specified point with respect to its assigned transmission channel or having a collection of data of each specified area with respect to its assigned transmission channel, wherein the transmission channel setting means establishes the transmission channel assigned to the specified position or area corresponding to the vehicle position which is measured by the position measuring means by referring to the table in the memory means.

In this case, it is preferred different transmission channels are assigned to the adjacent specified positions or specified areas.

Further, it is also preferred that the information communications system further comprises means for determining as to whether there is any other vehicle which is transmitting information by means of the same transmission channel.

Other aspect of the present invention is directed to an information communications system for communication between at least one vehicle and an information center, in which each vehicle comprises:

the position measuring means for measuring position of the vehicle;

transmission channel setting means for setting an information transmission channel by utilizing the positional Information of the vehicle which is measured by the position measuring means; and information transmission means for transmitting information externally by means of the transmission channel set by the transmission channel setting means, wherein the vehicle transmits the information to the information center by means of the established transmission channel set by the transmission setting means.

In this case, it is preferred that when the transmission vehicle reaches at a specified point or area or a point which is far from the specified point or area by a predetermined distance, the transmission channel setting means set a channel to a transmission channel which is previously assigned to the specified position or area, and then the information transmission means transmits the information by means of the established transmission channel.

Further, it is also preferred that each vehicle further comprises memory means which stores a table having a collection of data of each specified position with respect to its assigned transmission channel or having a collection of data of each specified area with respect to its assigned transmission channel, wherein the transmission channel setting means establishes the transmission channel assigned to the specified position or area corresponding to the vehicle position which is measured by the position measuring means by referring to the table in the memory means.

In this case, it is preferred that different transmission channels are assigned to the adjacent specified positions or specified areas.

Further, it is also preferred that the information communications system further comprises means for determining as to whether there is any other vehicle which is transmitting information by means of the same transmission channel.

The above described and other objects, structures and advantages of the present invention will be apparent from the following description of the preferred embodiments taken in conjunction with the appended drawings.

BRIEF DESCRIPTION OF THE DRAWINGS

FIG. 4 shows a frequency setting table which is utilized in the first embodiment of the information communications apparatus according to the present invention;

FIG. 12 shows a frequency setting table which is utilized in the second embodiment of the information communications apparatus according to the present invention;

DETAILED DESCRIPTION OF THE PREFERRED EMBODIMENTS

(1) First Embodiment

First, a detailed description will be given for a first embodiment of an information communications apparatus according to the present invention.

Figure 2:
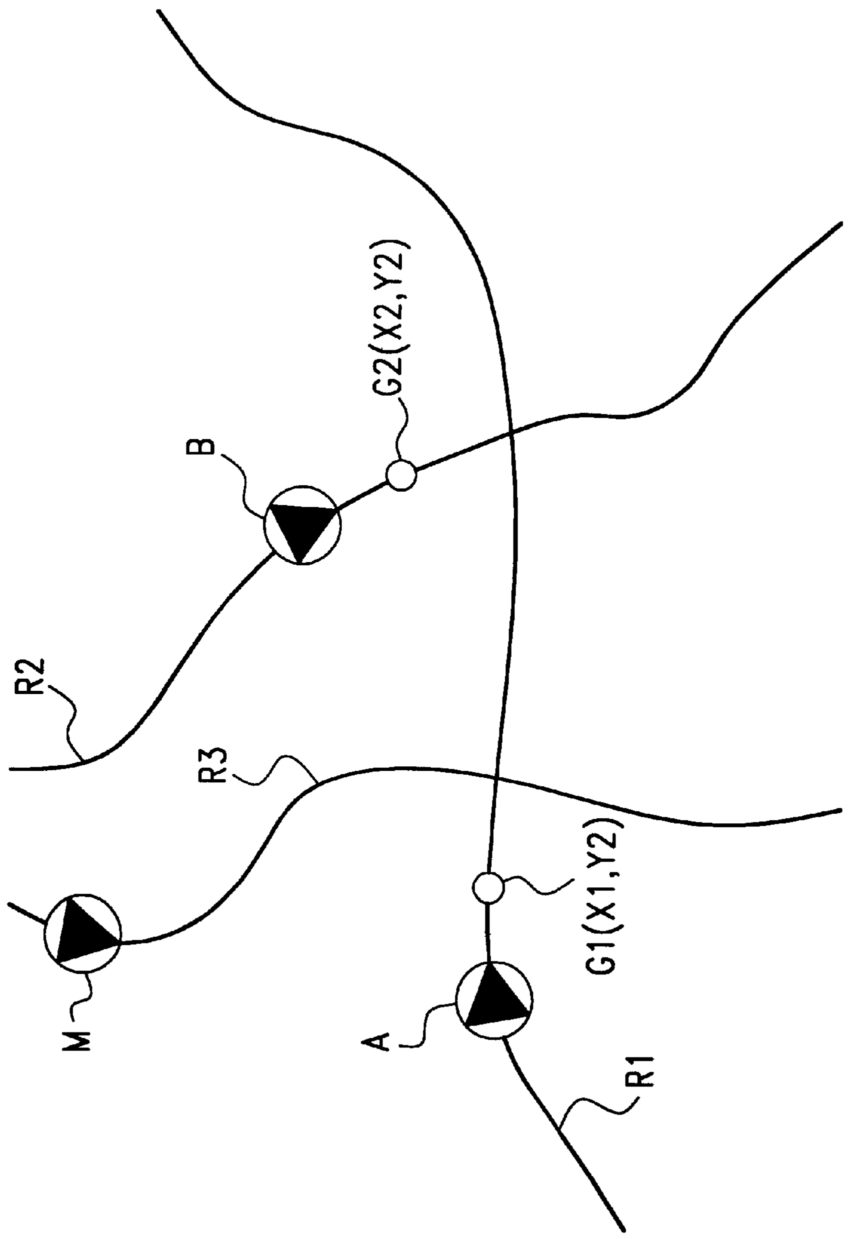
FIG. 2 is a schematic view which shows transmission vehicles and a reception vehicle which are traveling along roads.

This embodiment of the present invention is particularly suited for vehicle-to-vehicle communication. For example as shown in FIG. 2, two transmission vehicles A and B which transmit information and a reception vehicle M which receives information all lie within a certain area.

In this example, the transmission vehicle A transmits information when entering a predetermined area around a predetermined point called as grid G1 (defined by point coordinates X1, Y1) established on road R1, when passing through the grid G1, or when reaching a predetermined distance from the grid G1. Similarly, the transmission vehicle B transmits information when entering a predetermined area around a predetermined point called as grid G2 (defined by point coordinates X2, Y2) established on road R2, when the passing through the grid G2, or when reaching a predetermined distance from the grid G2. The transmission frequencies used at this time are those values established respectively for each of the grids G1 and G2. The transmitted information includes data related to the respective vehicles (e.g., positional data of the respective vehicles). As is further shown in FIG. 2, the reception vehicle M is traveling on road R3.

Figure 3:
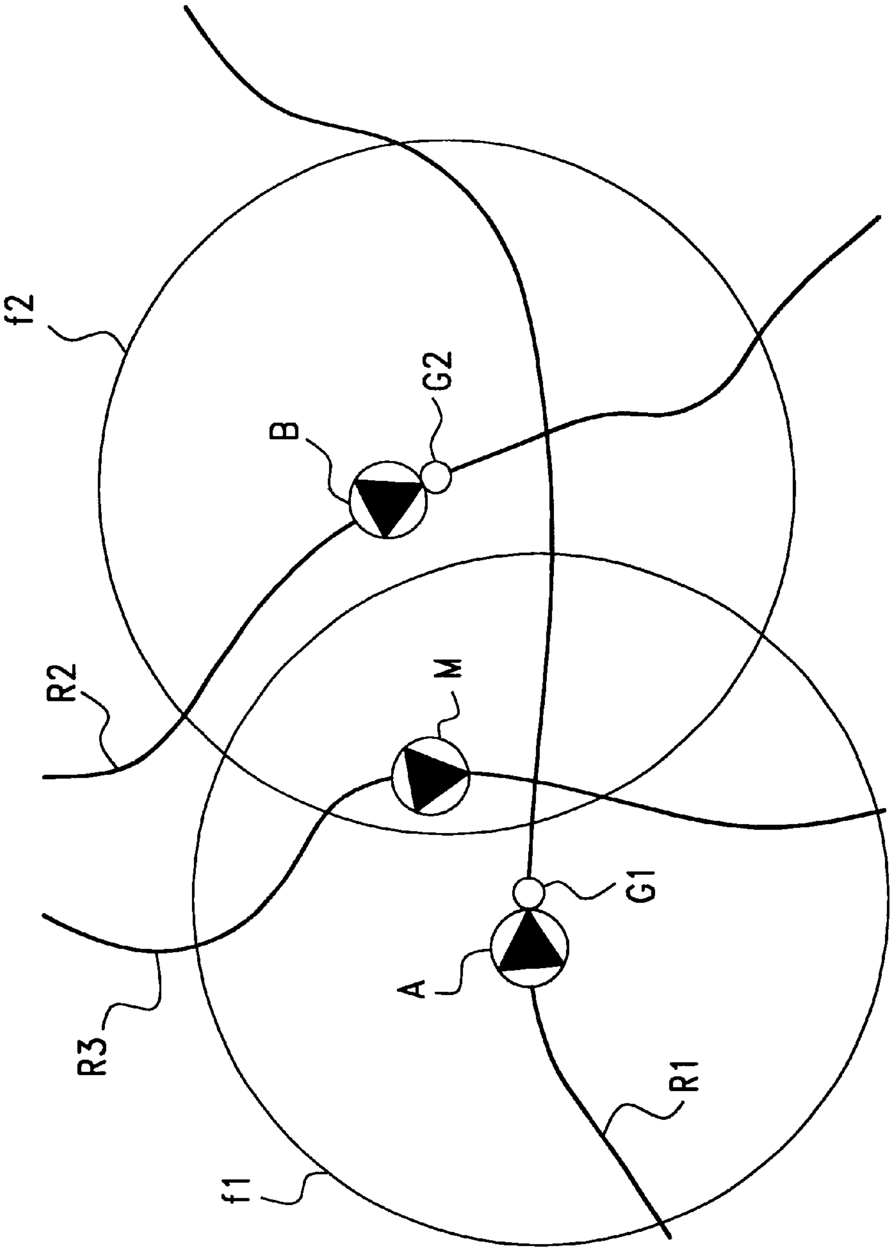
FIG. 3 shows a schematic view which shows a state in which the reception vehicle is receiving information from each of the transmission vehicles.

Next, FIG. 3 shows the conditions at the time when the reception vehicle M is receiving information. At this time, the transmission vehicle A is transmitting information at a frequency f1 established for the grid G1, and the transmission vehicle B is transmitting information at a frequency f2 established for the grid G2. In the example shown in FIG. 3, the reception vehicle M is capable of receiving both of the information transmitted at the frequency f1 and the information transmitted at the frequency f2.

In this regard, the user of the reception vehicle M selects one of the frequencies established for the grids G1 and G2, and then sets a reception means of the reception vehicle M at the selected frequency. For example, if the user sets the reception means at the frequency established for the grid G1, the reception vehicle M will receive positional information from the transmission vehicle A. In such case, the position data of the transmission vehicle A received by the reception vehicle M can be displayed together with a map, for example, on the display of a navigation system. In this way, since a transmission/reception frequency (i.e., communications channel) is established for each grid, It becomes possible for the reception vehicle to receive information without interference even when information is being transmitted from a plurality of transmission vehicles.

Next, a description of the structure of the information communications apparatus according to the present embodiment will be given with reference to FIG. 1.

Figure 1:
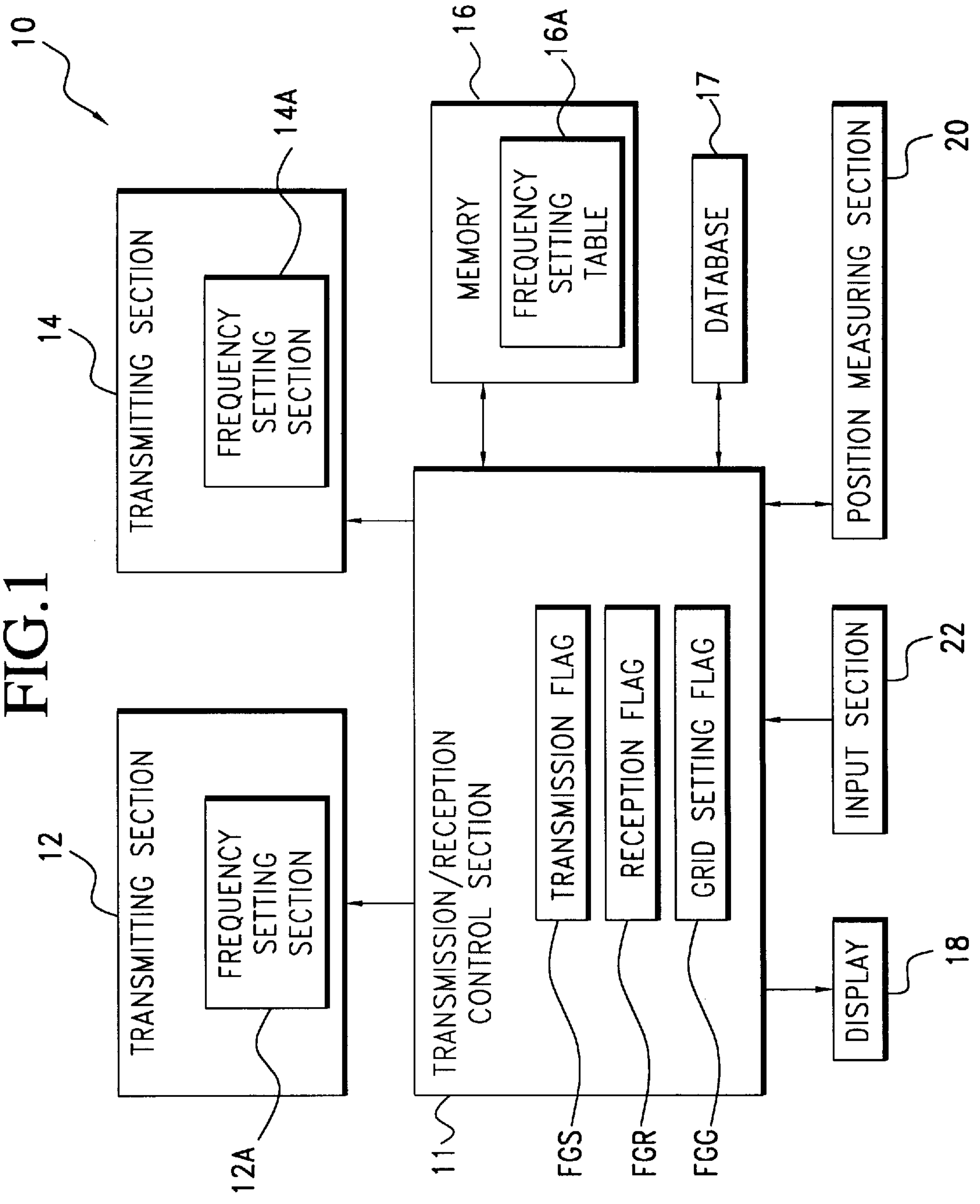
FIG. 1 is a block diagram which shows a structure of a information communications apparatus according to the present invention.

As shown in FIG. 1. an Information communications apparatus 10 of this invention includes a transmission/reception control section 11 as a main component. Further, the information communications apparatus 10 is equipped with a transmitting section (information transmission means) 12 for transmitting radio waves (information), and a receiving section (information reception means) 14 for receiving radio waves. The transmitting section 12 and the receiving section 14 are equipped with frequency setting section (transmission channel setting means) 12A and frequency setting section (reception channel setting means) 14A, respectively. Furthermore, the information communications apparatus 10 is equipped with a memory 16 which stores a frequency setting table 16A.

In addition, the information communications apparatus 10 is also provided with a display 18 and a database 17 storing map data which is used for displaying maps on the display 18. Further, the information communications apparatus 10 is provided with a position measuring section (position measuring means) 20 and an input section 22. As for the transmitting section 12, it may be comprised of an SS (Spread Spectrum communication type) wireless unit, for example, or any well-known wireless unit.

The transmission/reception control section 11 is constructed from a CPU or the like to enable control of each of the elements described above based on the ON/OFF states of a transmission flag FGS, a reception flag FGR and a grid setting flag FGG described below. In this connection, the transmission frequency (information transmission channel) of the transmitting section 12 can be changed by the frequency setting section 12A, and the reception frequency (information transmission channel) of the receiving section 14 can be changed by the frequency setting section 14A.

Further, in this embodiment, it is possible to set the transmission frequency and reception frequency at different frequency values, but in order to simplify the structure, the transmission and reception frequencies may be set at the same frequency value (that is, transmission and reception may be carried out over the same communications channel).

In addition to the frequency setting table, the memory 16 also stores programs for the control operations carried out by the transmission/reception control section 11, and holds a working region necessary for such control operations. As shown in FIG. 4, the frequency setting table 16A of the memory 16 is a table having collection of data of the point coordinates and, the associated transmission/reception frequencies of a plurality of grids G1, G2, G3, . . . , Gn. In this regard, it should be noted that different transmission/reception frequencies are assigned to at least the adjacent specified points (grids, intersections or the like) or specified areas.

The database 17 is constructed from a CD-ROM, DVD-ROM or the like in a manner similar to that of a typical navigation apparatus. The position measuring section 20 carries out measurements of the vehicle position by means of a GPS, self-contained navigation method or the like. The input section 22 is constructed from appropriate elements such as button switches, touch panels, remote control switches, joy sticks, microphones (for audio input) and the like.

Now, since the position measuring section 20, the database 17 and other elements described above are the same as those used to configure general navigation apparatuses, the information communications apparatus 10 according to the present embodiment can be incorporated into an existing navigation apparatus. In this regard, the structure shown in FIG. 1 is commonly used in both the transmission vehicle A and B and the reception vehicle M.

Next, a description will be given for the overall operations of this embodiment.

Figure 5:
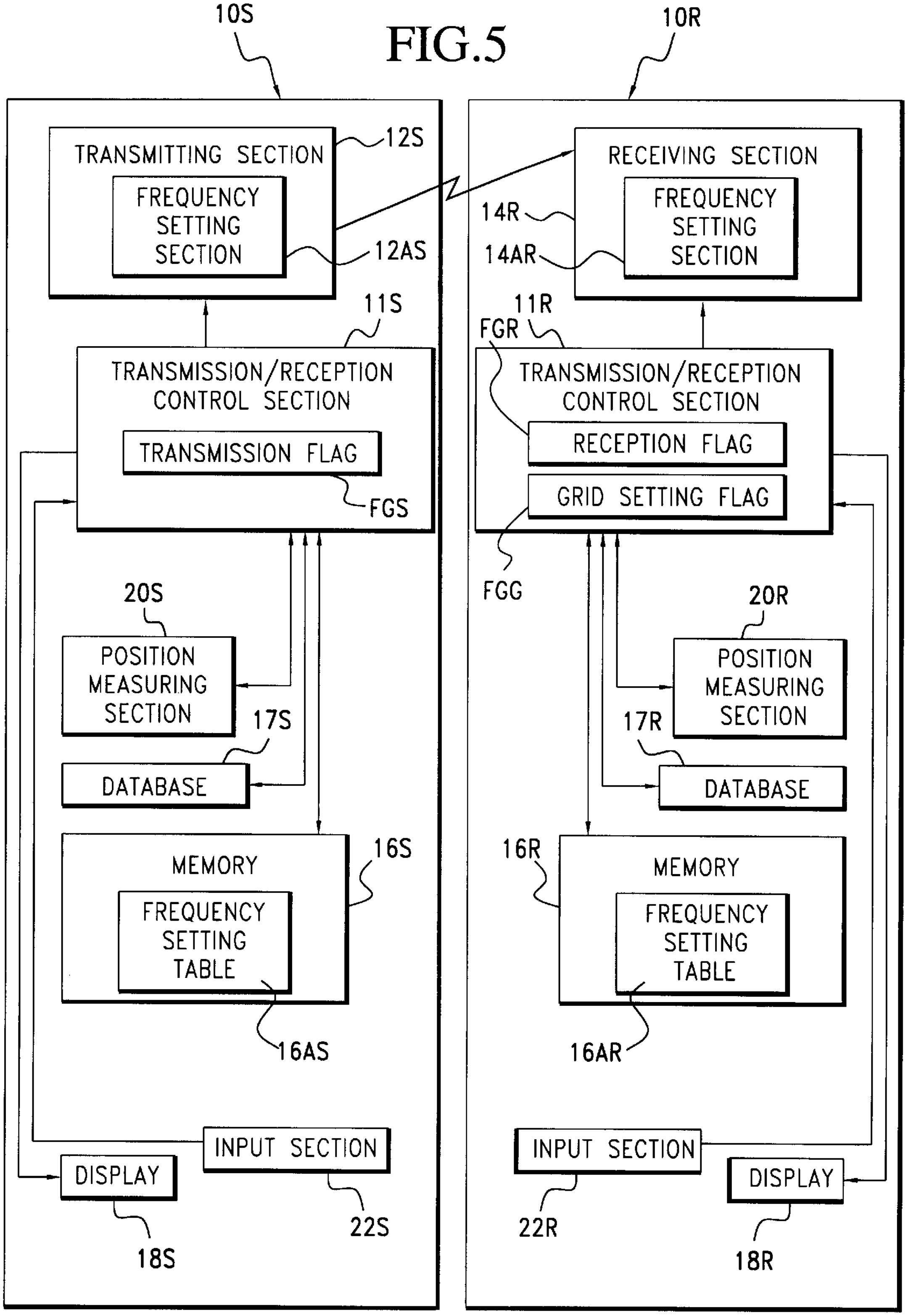
FIG. 5 is a block diagram which shows a structure of the information communication apparatus provided in the transmission vehicle and a structure of the information communication apparatus provided in the reception apparatus.

FIG. 5 shows the main portions of the information communications apparatuses used respectively in the transmission vehicles and reception vehicle In this figure, the relevant elements of the information communications apparatus used in the transmission vehicles are Indicated by the suffix "S", and the relevant elements of the information communications apparatus used in the reception vehicle are indicated by the suffix "R". Further, in this figure, the transmission vehicles A and B are respectively traveling toward the grids G1 and G2, and the reception vehicle M is approaching the vicinity of the grids G1 and G2. Furthermore, as shown in FIG. 4, the point coordinates and transmission/reception frequencies assigned to the grids G1 and G2 are included in the frequency setting table 16AS stored in the memory 16S.

First, with reference to the flow chart of FIG. 6, a description will be given for the information transmission process carried out by the information communications apparatuses of the transmission vehicles A and B.

In each of the information communications apparatuses of the transmission vehicles A and B, the vehicle position is constantly measured by the position measuring section 20. When the user (e.g., driver) in each of the transmission vehicles A and B establishes information transmission setting using the display 18S and the input section 24S, the transmission flag FGS of the transmission/reception control section 11S of each apparatus is set in an ON state (Step S10).

Then, in the transmission/reception control section 11S of the information communications apparatus of each of the transmission vehicles A and B, a comparison process Is carried out using the vehicle position measured by the position measuring section 20S, the point coordinates of the frequency setting table 16AS, and a map of the area surrounding the vehicle read out from the database 17S (Step S12).

Next, a judgement as to whether or not a grid lies within a radius L centered on the vehicle position (or whether or not a grid lies within a distance L from the vehicle position along the traveling route of the vehicle) is carried out (Step S14). As a result, in the case where a grid exists within such radius (or distance) L, the frequency assigned to such grid is read out from the frequency setting table 16AS (Step S16). For example, in the case where such grid is the grid G1 located at position (X1, Y1) shown in FIG. 2, the frequency f1 is read out from the table shown in FIG. 4, and in the case where such grid is the grid G2 located at position (X2, Y2) shown in FIG. 2 the frequency f2 is read out from the table shown in FIG. 4. This process is carried out in the same manner for all other grids.

Accordingly, by means of the frequency setting section 12AS of the transmitting section 12S, the transmission/reception control section 11S sets the transmission frequency at the frequency assigned to a predetermined grid. Thus, for the example shown in FIG. 2, the transmission frequency of the information communications apparatus of the transmission vehicle A is set at the frequency f1 which is assigned to the grid G1, and the transmission frequency of the information communications apparatus of the transmission vehicle B is set at the frequency f2 which is assigned to the grid G2.

Next, positional information is transmitted from the transmitting section 12S by means of such set frequency (Step S18). Namely, for the example shown in FIG. 2, the information communications apparatus of the transmission vehicle A transmits positional information at the frequency f1. and the information communications apparatus of the transmission vehicle B transmits positional information at the frequency f2. Then, the transmission flag FGS is set in an OFF state in each apparatus (Step S19).

Figure 7:
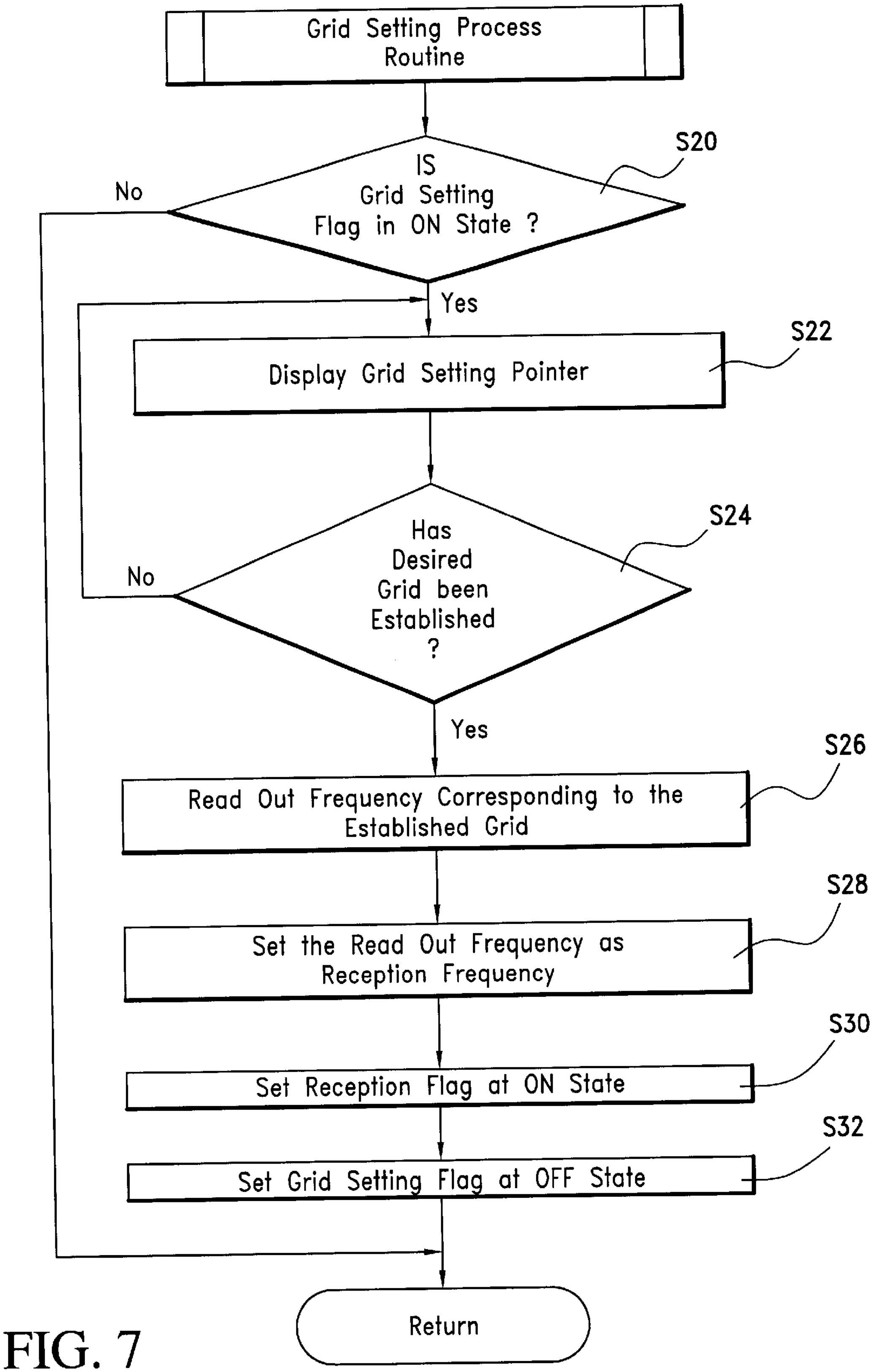
FIG. 7 is a flow chart which shows an information reception process carried out by the information communications apparatuses provided in the reception vehicle.

Next, with reference to FIG. 7, a description will be given for the information reception process carried out by the information communications apparatus of the reception vehicle M.

Figure 16:
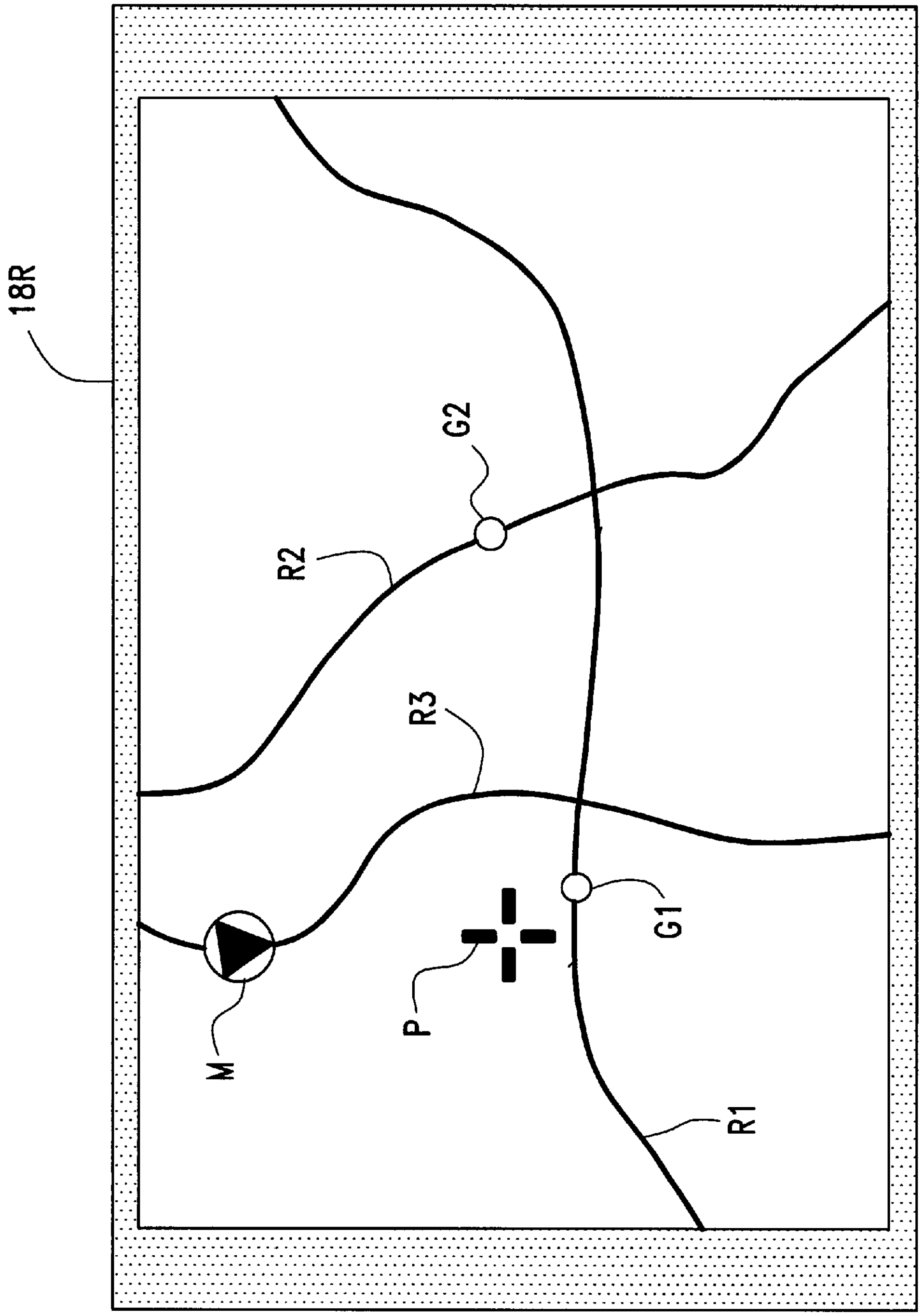
FIG. 16 shows an example of a display Screen of a information communications apparatus.

When the user (e.g., driver) in the reception vehicle M selects the grid setting menu, the grid setting flag FGG of the transmission/reception control section 11R is set in an ON state (Step S20). Then, by means of the transmission/reception control section 11R, the vehicle position M and a map of the surrounding area are displayed on the display 18 together with the grids G1, G2 and a grid setting pointer P (Step S22). An example of such display is shown in FIG. 16, in which the grid setting pointer is shown with a cross shape.

The user operates a joy stick or the like on the input section 22R to move the pointer P on the screen of the display 18 to specify a grid of which information is needed (Step S24). For example, if the pointer P is moved to the grid G1 or the vicinity thereof and then a select button (not shown in the drawings) of the input section 22R is pressed, the grid G1 is established as an information acquisition grid.

In the transmission/reception control section 11R, the frequency setting table 16AR is searched to read out the transmission/reception frequency f1 for the selected grid G1 (Step S26). Then, by means of the frequency setting section 14AR, the transmission/reception control section 11R sets the reception frequency of the receiving section 14R at the frequency f1 for the grid G1 (Step S28). After that, in the transmission/reception control section 11R, the reception flag PGR is set in an ON state (Step S30), and the grid setting flag FGG is set in an OFF state (Step S32).

Figure 8:
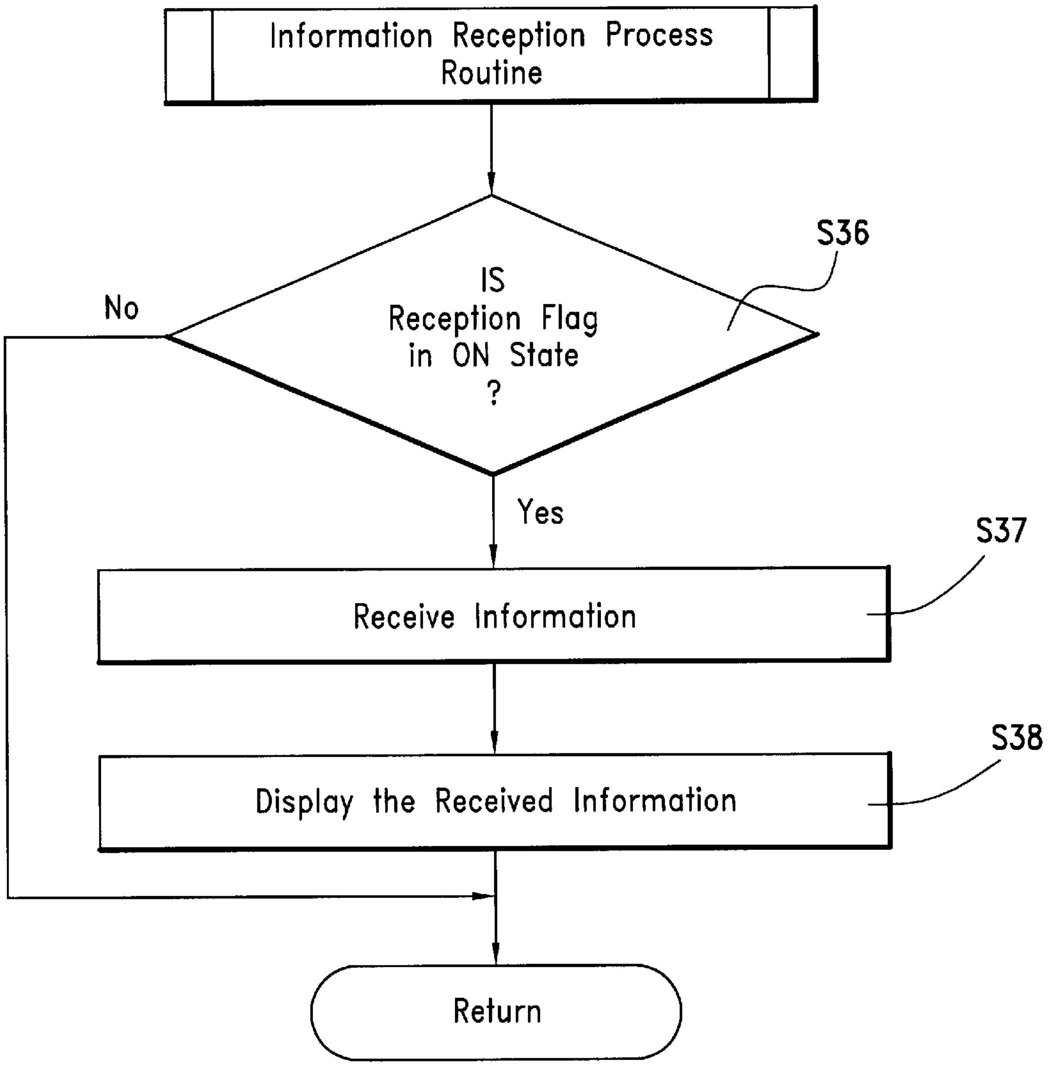
FIG. 8 is a flow chart which shows an information reception process routine carried out by the information communications apparatus provided in the reception vehicle.

Next, the information communications apparatus of the reception vehicle M carries out the information reception process routine shown in FIG. 8. Namely, with the reception flag FGR being set in an ON state (Step S36), information is received by the receiving section 14R. In the example mentioned above, since the reception frequency of the information communications apparatus of the reception vehicle M is set at the frequency f1, the receiving section 14R receives the information transmitted by the information communications apparatus of the transmission vehicle A, that is, receives information related to the vehicle position of the transmission vehicle A (Step S37).

Figure 9:
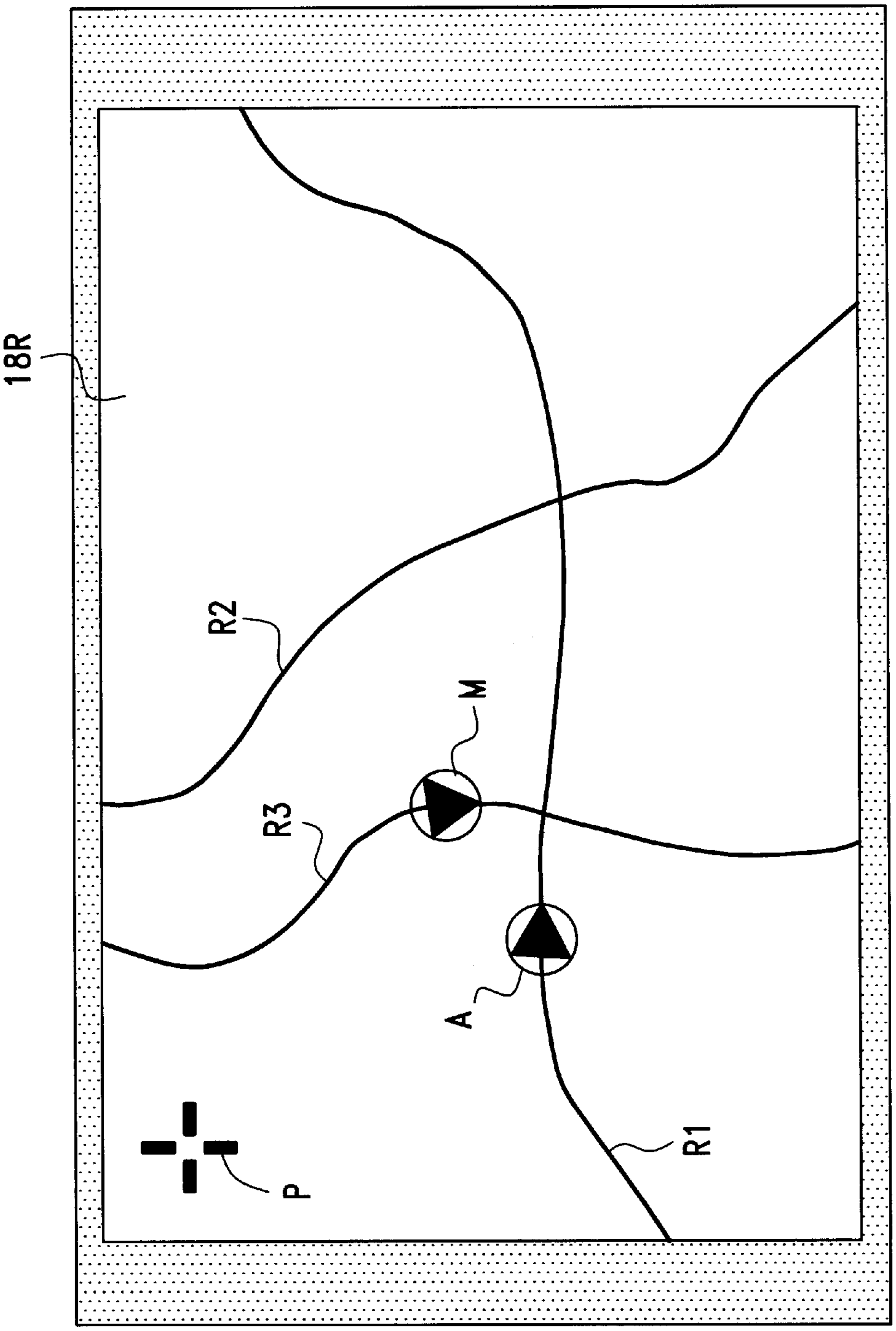
FIG. 9 shows an example of a display screen of the information communications apparatus, on which information received from the transmission vehicle is displayed.

The information received by the reception vehicle M is then displayed on the display 18R (Step S38). An example of such display is shown in FIG. 9. In this way, the position of the transmission vehicle A Is displayed together with the position of the reception vehicle M.

As described above, according to the present embodiment, the transmission frequency (i.e., communications channel) of each of the information communications apparatuses of the transmission vehicles is established for each grid. Further, the reception frequency of the information communications apparatus of the reception vehicle is set, by the user, at the frequency in association with the grid of which data is needed. As a result, even when information is being transmitted simultaneously from areas including a plurality of grids, it becomes possible to carry out a reliable reception of information without interference because of the transmission frequencies being different from each other.

Thus, for the example shown in FIG. 3, even in the case where the information communications apparatuses of the transmission vehicles A and B are transmitting information simultaneously, since the information communications apparatus of the transmission vehicle A has a transmission frequency f1 that is different from the transmission frequency f2 of information communications apparatus of the transmission vehicle B, it becomes possible for the information communications apparatus of the reception vehicle M to receive information from either the transmission vehicle A or the transmission vehicle B without interference. In this way, because there is no need to establish a fixed frequency for each information communications apparatus used in the transmission vehicles, it becomes possible for the information communications apparatus 10 to be constructed with a simple structure. In this connection, it should be noted that this arrangement can be used even for the case where an information communications apparatus of an information center, electronic beacon or the like is located at the position of the reception vehicle M.

(2) Modifications of First Embodiment

In the first embodiment described above, the information transmitted from the information communications apparatuses of the transmission vehicles was described as positional information, but it should be noted that it is possible for the information communications apparatuses of the transmission vehicles to transmit any kind of information. For example, the information communications apparatuses may transmit information indicating the ON/OFF state of the wipers, information on the time the vehicle passes through a specific point, information on the frequency of braking operations, and information on the traveling speed of the vehicle.

Further, even though the transmission and reception of information was described for the case of vehicle-to-vehicle communications in the embodiment described above, the reception vehicle may be replaced by an electronic beacon or information center for receiving information. For example, at such electronic beacon or information center, information on the ON/OFF state of the wipers are received to determine weather conditions and display them. Further, information on the frequency of braking operations and traveling speed is received and then subjected to a statistical process to determine traffic congestion conditions and display them.

(3) Second Embodiment

Next, a description will be given for a second embodiment of the information communications apparatus according to the present invention. In contrast with the previous embodiment in which the frequency of the transmission vehicles was set for each grid, in this embodiment the frequency is set for each road or traffic lane. Further, information from a plurality of transmission vehicles is received by time-divisionally changing its reception frequency.

Figure 10:
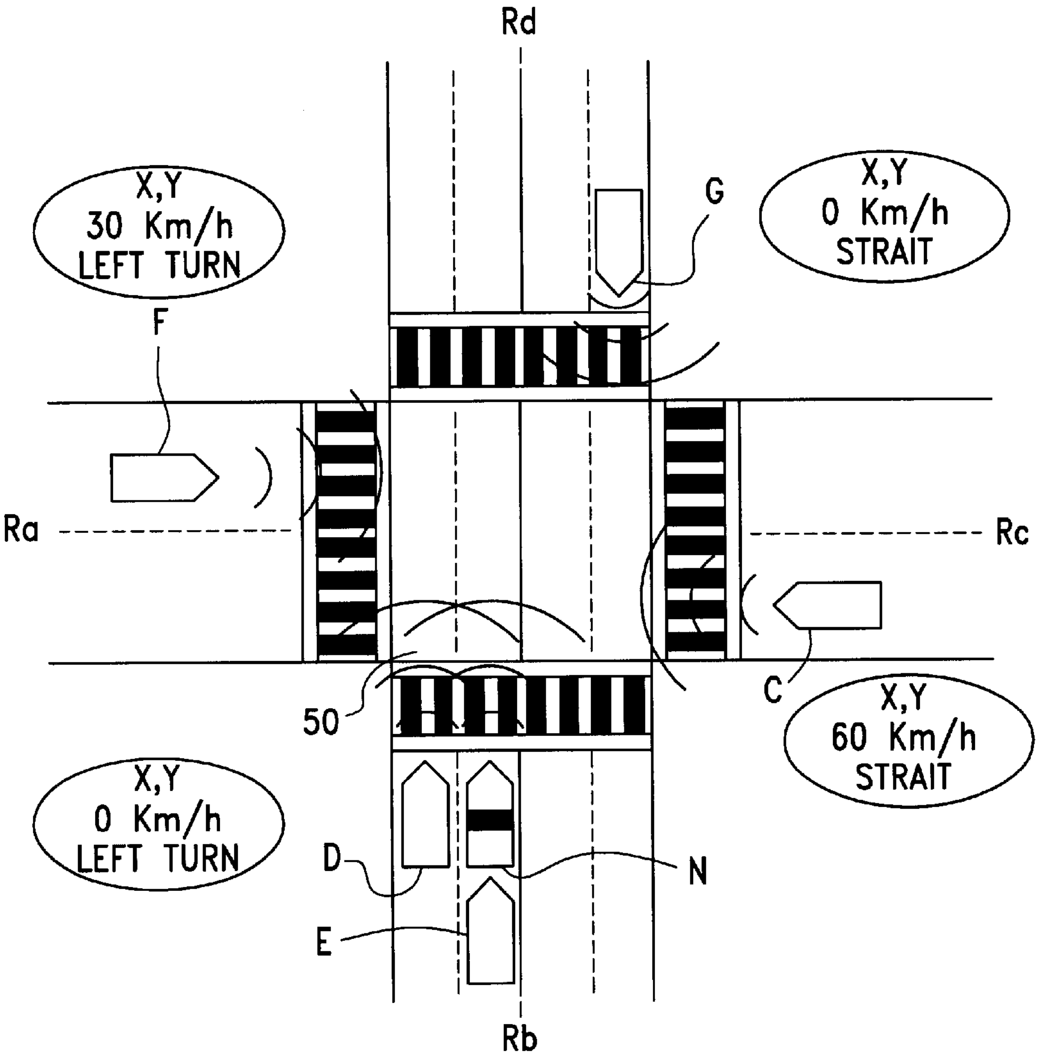
FIG. 10 shows an example of a situation In which a plurality of transmission vehicles and a reception vehicle are just about to enter an intersection.

FIG. 10 shows an example situation in which a plurality of transmission vehicles C–G and a reception vehicle N are just about to enter an intersection 50 located at a specific point. In such case, when the transmission vehicles C–G approach the intersection 50, the information communications apparatuses of such transmission vehicles C–G transmit positional information at different frequencies fc–fg respectively established for the traffic lanes thereof. On the other hand, when the reception vehicle N approaches the intersection 50, the reception frequency of the information communications apparatus thereof is changed at predetermined time intervals to sequentially match the frequency established for each traffic lane. For example, if the reception frequency starts at the frequency fc, the reception frequency will change to the frequency fd and then to the frequency fe, and so on in a sequential manner.

In the way, the information communications apparatus of the reception vehicle N changes time-divisionally its reception frequency as described above, it will sequentially receive positional information from each of the transmission vehicles C–G at the respective frequencies established for each of the traffic lanes. Then, based on this received information, the information communications apparatus of the reception vehicle N displays each vehicle on a map of the intersection 50. In this way, the position of each vehicle approaching the intersection 50 can be clearly ascertained.

Figure 11:
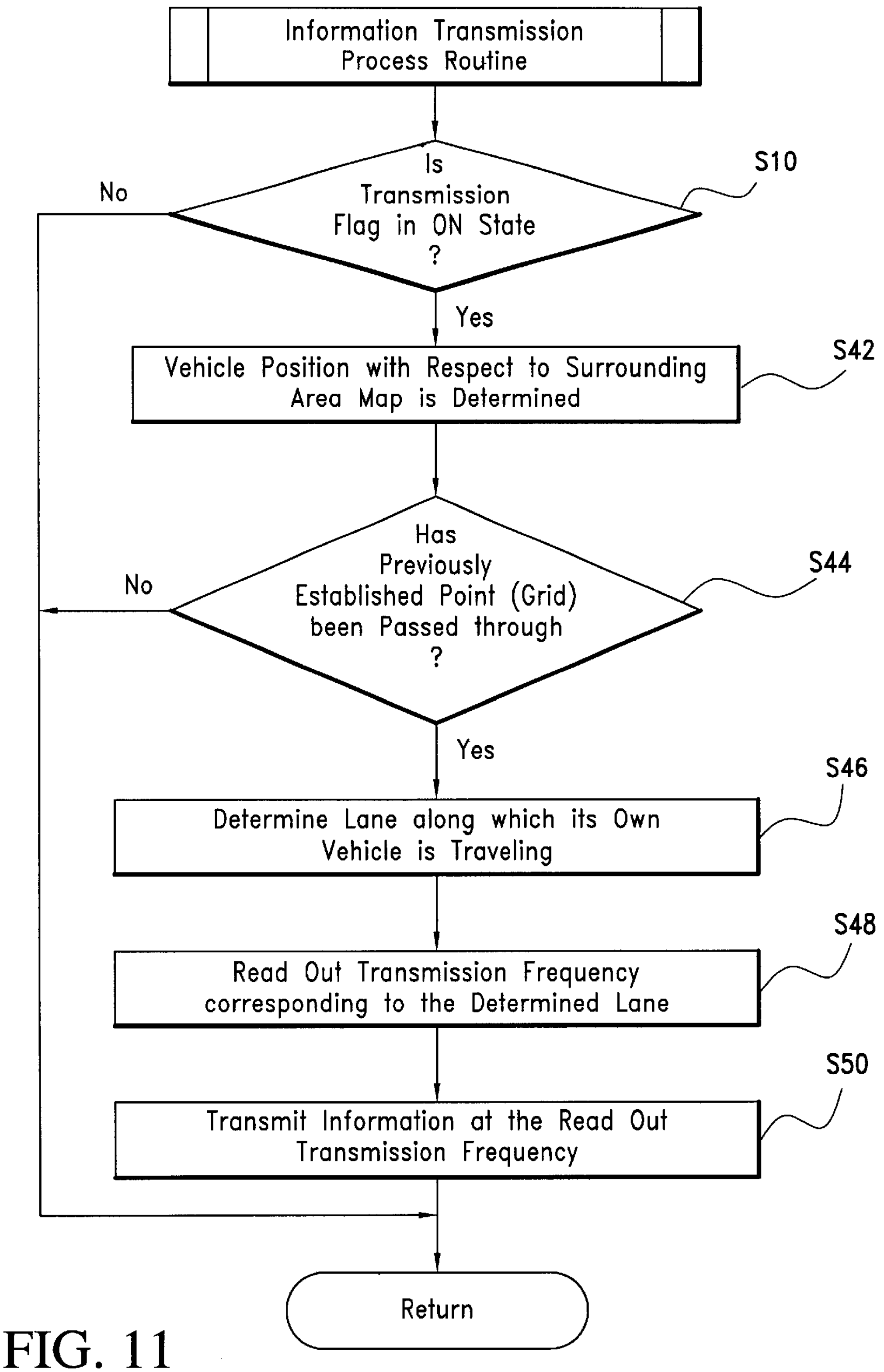
FIG. 11 shows a flow chart which shows an information transmission process routine carried out by the information communications apparatus provided in the transmission vehicle.

The operations described above will now be explained in detail with reference to the flow chart of the positional information transmission process routine shown in FIG. 11.

First, in the same manner as was described above for the first embodiment, the transmission flag of the transmission/reception control section 11S of the information communications apparatus of each transmission vehicle C–G is set in an ON state (Step S10), and then the position of each vehicle with respect to the surrounding area map is determined (Step S42).

Next, in the transmission/reception control section 11S, a judgement as to whether or not a previously set (selected) position (grid) has been passed through is carried out (Step S44). In this regard, such a position (grid) is established, for example, at an appropriate position before the entrance to the intersection 50. Alternatively, a judgement as to whether or not the distance from the transmission vehicles C–G to the intersection 50 is less than a predetermined distance may be carried out.

Next, in the case where the position (grid) has been passed through, or in the case where the distance to the intersection 50 is less than the predetermined distance, the transmission/reception section 11S determines the traffic lanes along which the transmission vehicles C–G are traveling (Step S46). This determination is carried out by comparing each vehicle position measured by the position measuring section 20S with the map data of the database 17S. Alternatively, this determination may be carried out using other well-known traffic lane recognition devices (e.g., a device which recognizes a traffic lane along which a vehicle is traveling by processing a photographed image of road). Then, the transmission/reception control means 11S retrieves the frequency setting table 16AS to read out the relevant frequency (Step S48).

In this connection, FIG. 12 shows an example of the frequency setting table 16AS which is utilized in the second embodiment of the information communications apparatus. The table shown in FIG. 12 shows the relationship between the rods Ra–Rd and the lanes at the intersection shown in FIG. 10, and the frequencies assigned to each road or lane.

Further, the example shown in FIG. 12 corresponds to the intersection 50 shown in FIG. 10. The roads listed in the table of FIG. 12 correspond to the roads Ra–Rd that enter the intersection 50. In this example, the roads Ra and Rc are two-way roads having one lane in each direction, and the roads Rb and Rd are two-way roads having two lanes in each direction.

Figure 13:
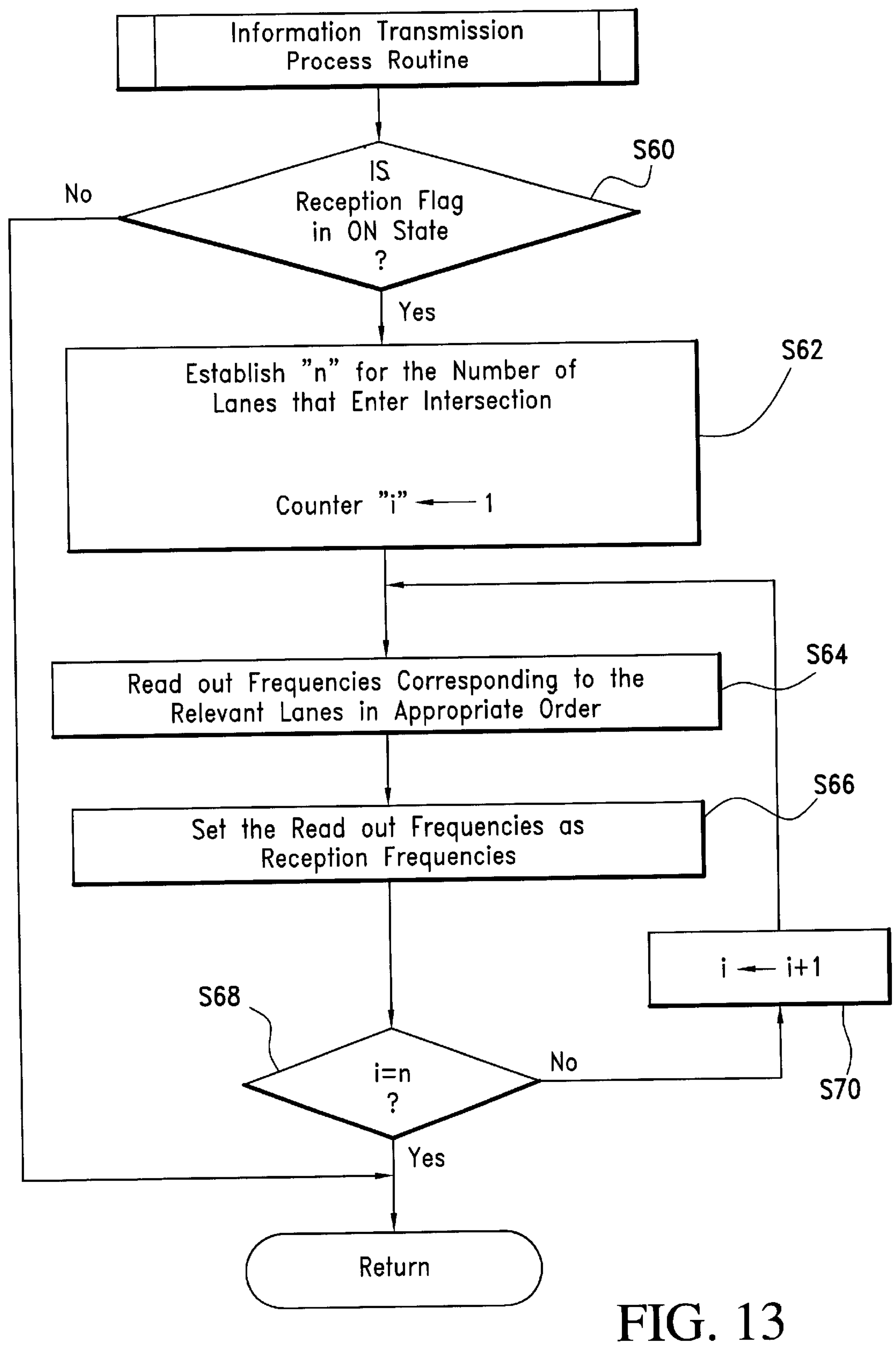
FIG. 13 shows a flow chart which shows an information reception process routine carried out by the information communications apparatus provided in the reception vehicle.

Next, the positional information reception process routine will be described with reference to the flow chart of FIG. 13.

In the same manner as that described with reference to FIG. 11, when the reception vehicle N passes through a previously set position (selected grid), the reception flag FGR of the transmission/reception control section is set in an ON state (Step S60). Then, a counter is set to establish for the number of traffic lanes that enter the intersection (Step S62), and the transmission/reception frequencies of the relevant roads are read out from the frequency setting table 16R in an appropriate order (e.g., in a clockwise order starting from the reception vehicle) (Step S64). Then, the reception frequency of the receiving section 14R is changed in a sequential manner by the frequency setting section 14AR (Step S66), and information transmitted from each of the transmission vehicles is sequentially received at predetermined time intervals (Steps S68, S70).

Figure 14:
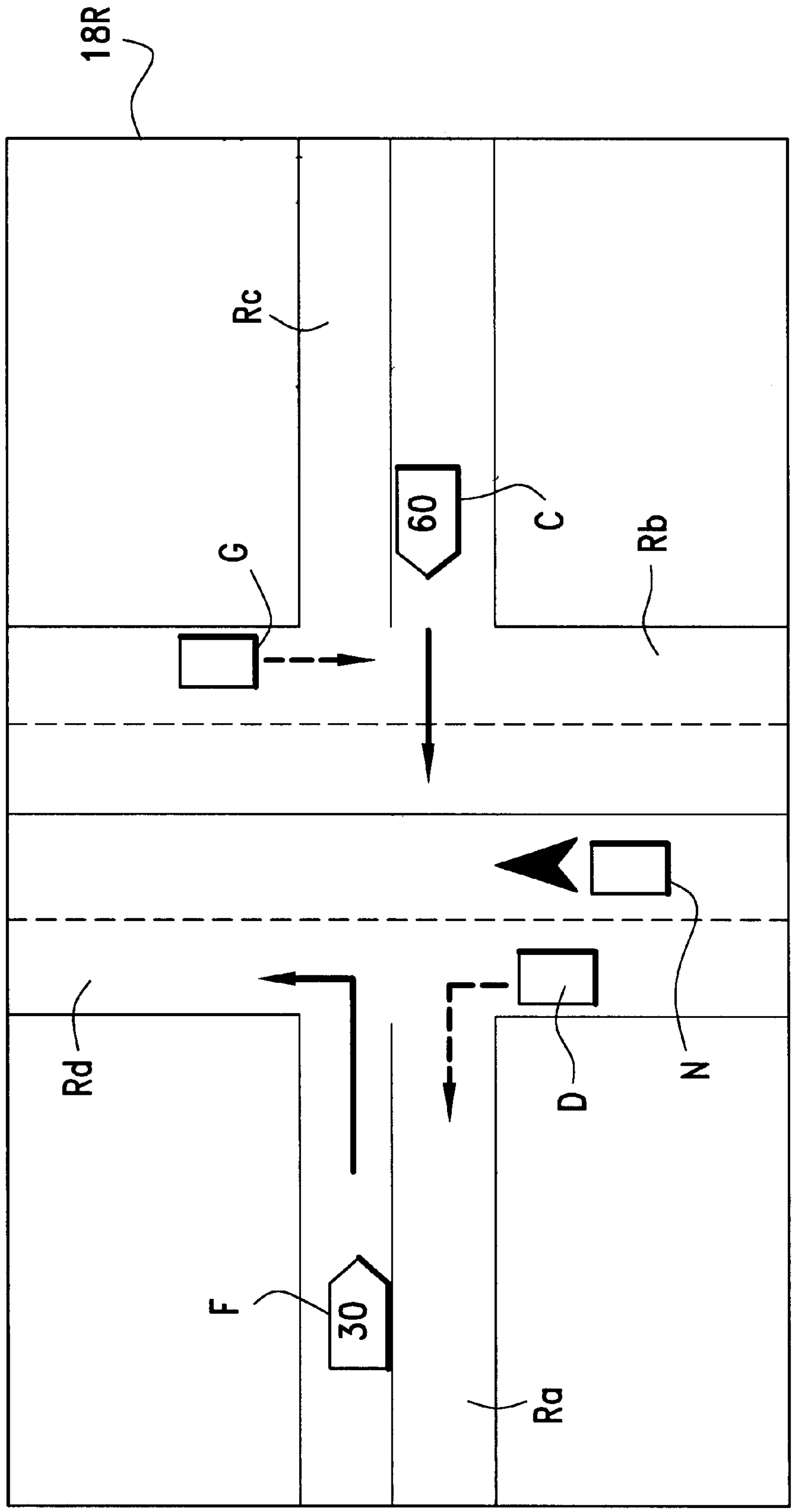
FIG. 14 shows an example of a display screen of a information communications apparatus, on which information received from the transmission vehicles is displayed.
Figure 15:
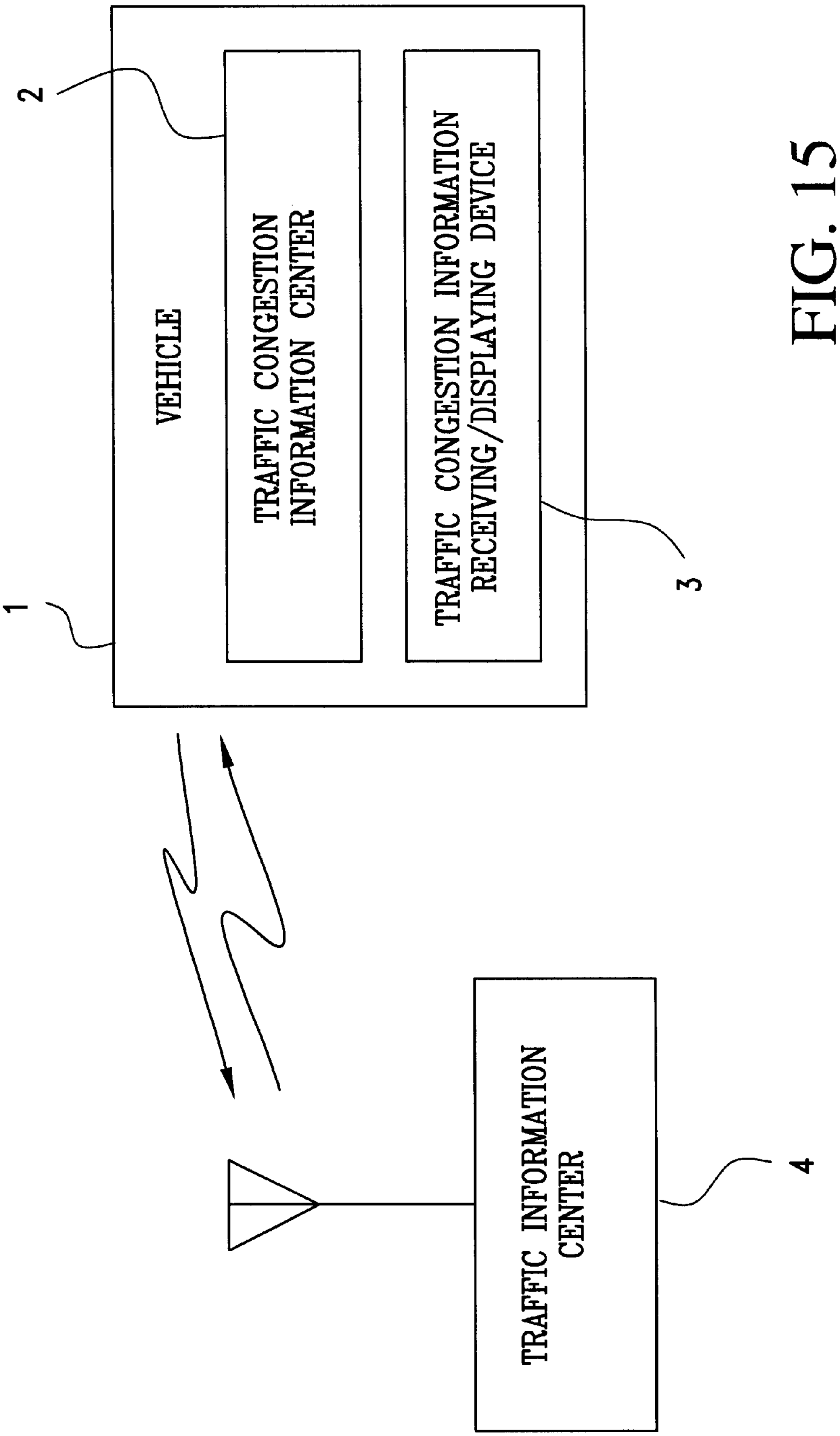
FIG. 15 is a block diagram which shows conventional information communication apparatuses.

The received positional information of the transmission vehicles C–G is displayed on the display 18R of the information communications apparatus of the reception vehicle N. An example of such display is shown in FIG. 14. Further, in this example, velocity information of each of the transmission vehicles C–G is displayed together with the positional information thereof.

At this point, it should be noted that the present invention has many modifications, and it is possible to make many modifications to the embodiments described above. For example, such modifications include the followings.

(1) In the embodiments described above, different communications channels were established by changing the frequency in associate with the grid or traffic lane, but it is also possible to use any communication method that makes it possible to establish communications channels without interference. For example, instead of the frequency, changes may be made to the phase or amplitude. Further, any combination of changes may be made to the frequency, phase and amplitude. Furthermore, the present invention can be applied to either digital or analog systems.

(2) In the embodiments given above, the information to be transmitted and received was described as including positional information of the transmission vehicles, information indicating the ON/OFF state of the wipers, information indicating the time a specific point (grid) has been passed through, information on the frequency of braking operations, information on the travel velocity and the like. However, the present invention is not limited thereto, and it is possible for the information communications apparatus of this invention to transmit and receive any other information such as information on atmospheric temperature and atmospheric pressure.

(3) In the embodiments given above, the information obtained from the transmission vehicles was described as being displayed on the display of the information communications apparatus of the reception vehicle. However, the present invention is not limited thereto, and it is possible to use any appropriate output means in accordance with the user's needs, such as an audio output or print out.

(4) The information communications apparatus according to the present invention may be incorporated into an existing navigation system for vehicles. Further, in the embodiments given above, the information communications apparatus was described as being used in vehicles (i.e., cars and the like), but the present invention is not limited thereto, and the present invention may be applied to any moving body such as portable terminals and mobile terminals.

(5) In the description of the first embodiment given above (see FIG. 6), vehicles that reach a predetermined distance from a grid (or pass through a grid) will transmit positional information and the like on a channel (frequency) assigned to such grid. However, in the case where a plurality of vehicles approach the same grid (or pass through the same grid), there is a risk of interference. In response to such situation, when a vehicle reaches a predetermined distance to a grid, before transmitting positional information on the channel assigned to such grid, the vehicle first judges whether or not there is any other vehicle in the surrounding area which is transmitting information using the same channel, and in the case where a transmission on the same channel is taking place, the vehicle waits for the other vehicle to finish transmission and then carries out its own transmission. In other words, a Step S15 for Judging whether or not there is any other vehicle in the surrounding area which is transmitting information using the same frequency is inserted between Step 14 and Step 16 in the flow chart of FIG. 6.

Figure 6:
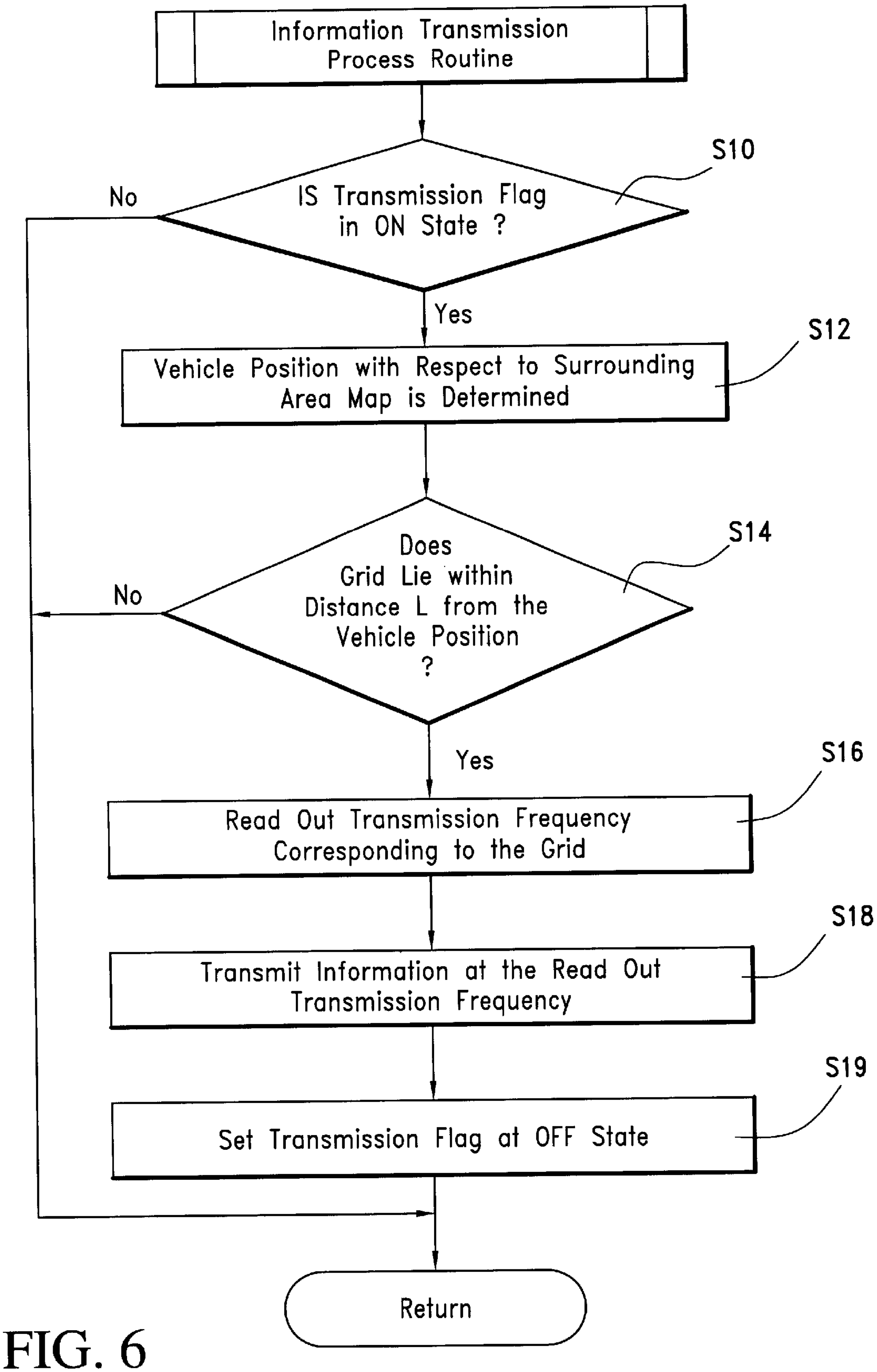
FIG. 6 is a flow chart which shows an information transmission process carried out by the information communications apparatuses provided in the transmission vehicle.
Figure 17:
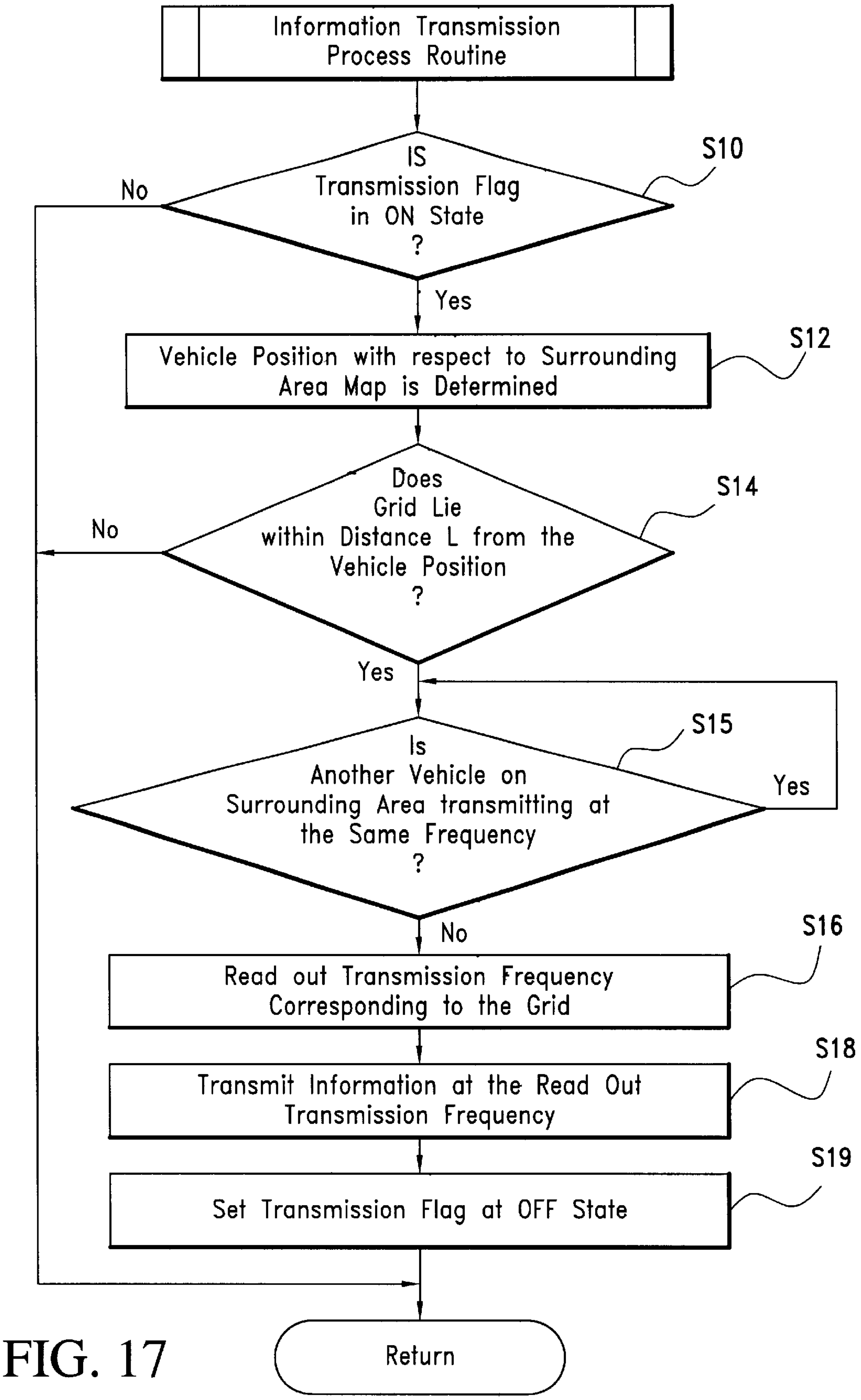
FIG. 17 shows a flow chart which shows an information transmission process routine carried out by the information communications apparatus provided in the transmission vehicle.

In this connection, FIG. 17 is a flow chart showing the insertion of the Step S15 in the flow chart of FIG. 6. In the case where it is judged at Step S15 that no other vehicles are transmitting information using the same frequency (i.e., NO judgement at Step S15), the routine proceeds to Step S16, on the other hand, in the case where it is judged at Step S15 that another vehicle is transmitting information using the same frequency (i.e., YES judgement at Step S15), the routine goes into standby mode, and the steps after Step S16 are not carried out until the other vehicle completes its transmission.

Further, when a vehicle reaches a predetermined distance to a grid (or passes through a grid), the information communications apparatus of the vehicle may automatically set the reception frequency thereof at a frequency (channel) assigned to the grid to make a judgement as to whether or not there is any other vehicle in the surrounding area which is transmitting information using the same channel. In other words, when information is received from other vehicle at the reception frequency set at the frequency assigned to the grid, the other vehicle will be judged to be transmitting information at the same frequency (i.e. the frequency of the grid). In this way, by means of the Step S15, the vehicle waits for the other vehicle in the surrounding area to complete transmission at the same frequency before transmitting its own positional information and the like, and this makes it possible to prevent interference.

(6) In the embodiments described above, when the transmission vehicle reaches at a point which is far from a previously set specified point (grid or intersection) by a predetermined distance, the frequency setting section of the information communications apparatus of the transmission vehicle establishes transmission frequency which is assigned to the specified point, and then the transmitting section thereof transmits the information at the established transmission frequency. However, the present invention is not limited to such an embodiment, and the transmission vehicle may transmit information in accordance with the following manner, for example. Namely, when the transmission vehicle reaches at a point which is far from a previously set specified area by a predetermined distance, the frequency setting section of the information communications apparatus of the transmission vehicle establishes transmission frequency which is assigned to the specified area, and then the transmitting section thereof transmits the information at the established transmission frequency. Further, it is also possible to use a specified line to set different communications channels (frequencies).

As described above, because different communications channels are established in association with positional information such as specific points or areas (grids) or traffic lanes, even in the case where a plurality of vehicles transmit information from close to each other, the present invention makes it possible to receive information without interference as long as transmission channels are different to each other. Further, in contrast with prior art systems which establish a communication channel for each vehicle, the information communications apparatus according to the present invention makes it possible to transmit and receive information without increasing the burden on the communication equipment.

Finally, it is to be understood that many changes and additions may be made to the embodiments described above without departing from the scope and spirit of the invention as defined in the appended claims.

What is claimed is:

1. An information communications apparatus carried on board a vehicle, comprising:

position detecting means for detecting position of the vehicle;

transmission channel setting means for setting an information transmission channel by utilizing the detected position;

information transmission means for transmitting information externally by means of the transmission channel set by the transmission channel setting means; and a memory containing stored therein, a table correlating a collection of information data for each of a plurality of points or areas with an assigned transmission channel, and wherein the transmission channel setting means establishes the transmission channel assigned to a specified point or area corresponding to the detected vehicle position by referring to the table in the memory.

2. The information communications apparatus as claimed in claim 1, wherein when the vehicle reaches a specified point or area or a point which is a predetermined distance from the specified point or area, the transmission channel setting means sets the transmission channel to the assigned channel which is previously assigned to the specified point or area, and then the information transmission means transmits information data for the specified point or area by means of the established transmission channel.

3. The information communications apparatus as claimed in claim 2, wherein different transmission channels are assigned to adjacent points or areas.

4. The information communications apparatus as claimed in claim 1, wherein different transmission channels are assigned to adjacent points or areas.

5. The information communications apparatus as claimed in claim 1, wherein the points or areas are roads or traffic lanes.

6. The information communications apparatus as claimed in claim 5, wherein different transmission channels are assigned to adjacent roads or lanes.

7. The information communications apparatus as claimed in claim 5, further comprising reception channel setting means for setting a reception channel for receiving information; and information reception means for receiving information transmitted from another vehicle or an information center using the reception channel set by the reception channel setting means.

8. The information communications apparatus as claimed in claim 7, wherein the reception channel sitting means is constructed such that an operator in the vehicle can select a desired reception channel.

9. The information communications apparatus as claimed in claim 7, wherein when the vehicle reaches a specified intersection or a position a predetermined distance from the specified intersection, the reception channel setting means switches the reception channel in a sequential manner to each of the transmission channels assigned to each of the roads or lanes connected to the specified intersection by referring to the table stored in the memory means.

10. The information communications apparatus as claimed in claim 1 further comprising:

reception channel setting means for setting a reception channel for receiving information;

information reception means for receiving information transmitted from another vehicle or an information center using the reception channel set by the reception channel communication means; and display means for displaying the received information to a driver of the vehicle.

11. An information communications system between at least two vehicles, in which each of the vehicles carries on board communication equipment comprising:

position detecting means for detecting position of the vehicle;

transmission channel setting means for setting an information transmission channel by utilizing the detected position;

information transmission means for transmitting information externally by means of the transmission channel set by the transmission channel setting means;

reception channel setting means for setting a reception channel for receiving information;

information reception means for receiving information transmitted from another vehicle or an information center using the reception channel set by the reception channel setting means;

wherein a transmission vehicle transmits the information by means of the transmission channel set by the transmission setting means and a reception vehicle receives the transmitted information by means of the reception channel set by the reception channel setting means; and wherein each of the transmission and reception vehicles further comprises a memory containing, stored therein, a table correlating a collection of information data for each of a plurality of points or areas with an assigned transmission channel, and wherein the transmission channel setting means establishes the transmission channel assigned to a specified position or area corresponding to the detected position by referring to the table in the memory means.

12. The information communications apparatus as claimed in claim 11, wherein when the vehicle reaches a specified point or area or a point which is a predetermined distance from the specified point or area, the transmission channel setting means sets the transmission channel to the assigned channel which is previously assigned to the specified point or area, and then the information transmission means transmits information data for the specified point or area, by means of the established transmission channel.

13. The information communications system as claimed im claim 12, further different transmission channels are assigned to adjacent points or areas.

14. The information communications system as claimed in claim 11, wherein different transmission channels are assigned to adjacent points or areas.

15. The information communications system as claimed in claim 11, further comprising means for determining whether or not there is any other vehicle which is transmitting information by means of the same transmission channel.

16. The information communication system as claimed in claim 11 further comprising:

display means for displaying the received information to a driver of the vehicle.

17. An information communications system for communication between at least one vehicle and an information center, in which each vehicle carries on board communication equipment comprising:

position detecting means for detecting position of the vehicle;

transmission channel setting means for setting an information transmission channel by utilizing the detected position of the vehicle;

information transmission means for transmitting information externally to the information center by means of the transmission channel set by the transmission channel setting means; and a memory containing, stored therein, a table correlating a collection of information data for each of a plurality of points or areas with an assigned transmission channel, and wherein the transmission channel setting means establishes the transmission channel assigned to a specified point or area corresponding to the detected vehicle position by referring to the table in the memory.

18. The information communications system as claimed in claim 17, wherein when the vehicle reaches a specified point or area or a point which is a predetermined distance from the specified point or area, the transmission channel setting means sets the information transmission channel which is previously assigned to the specified point or area, and then the information transmission means transmits the information data for the specified point or area by means of the set transmission channel.

19. The information communications system as claimed in claim 18, wherein different transmission channels are assigned to adjacent points or areas.

20. The information communications system as claimed in claim 17, wherein different transmission channels are assigned to the adjacent points or areas.

21. The information communications system as claimed in claim 17, further comprising means for determining whether or not there is any other vehicle which is transmitting information by means of the same transmission channel.

22. The information communication system as claimed in claim 17 said communication equipment further comprises:

reception channel setting means for setting a reception channel for receiving information;

information reception means for receiving information transmitted from another vehicle or an information center using the reception channel set by the reception channel communication means; and display means for displaying the received information to a driver of the vehicle.

* * * * *